United States Patent Office 3,132,117
Patented May 5, 1964

3,132,117
TRIFLUOROALKOXYALKYL SUBSTITUTED ORGANOSILICON COMPOUNDS
Gustav A. Schmidt, Schenectady, N.Y., assignor to General Electric Company, a corporation of New York
No Drawing. Filed Oct. 31, 1960, Ser. No. 65,926
7 Claims. (Cl. 260—46.5)

The present invention relates to novel trifluoroalkoxyalkyl substituted organosilicon compositions and to a method for making them. More particularly, the present invention relates to a method for producing novel 1,1,1-trifluoroalkoxyalkyl substituted halosilanes, cyclopolysiloxanes, to the substituted organopolysiloxanes derived therefrom, and to the variety of valuable materials produced thereby.

The novel trifluoroalkoxyalkyl substituted organosilicon compositions of the present invention include substituted halosilanes that have the formula:

(1) $CF_3—C(R)_2—O—CHR—C(R)_2—Si(R')_aX_{3-a}$ and substituted cyclopolysiloxanes that have the formula:

(2) 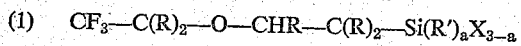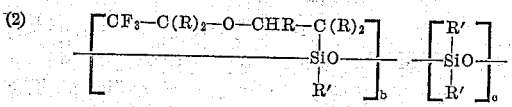

where R is a member selected from the class of hydrogen and lower alkyl groups, R' is a member selected from the class of monovalent hydrocarbon radicals and halogenated monovalent hydrocarbon radicals, X is halo, $a$ is an integer equal to from 0 to 2, inclusive, $b$ is an integer equal to from 1 to 10, inclusive, $c$ is a whole number equal to from 0 to 9, inclusive, and the sum of $b$ and $c$ is equal to from 3 to 10, inclusive.

Included within the scope of the radicals represented by R of Formulae 1 and 2 are hydrogen and lower alkyl radicals such as methyl, ethyl, propyl, butyl, etc. radicals. Radicals that are included in R' of Formulae 1 and 2 are aryl radicals and halogenated aryl radicals such as naphthyl, tolyl, phenyl, halophenyl, etc. radicals; aralkyl radicals including benzyl, phenylethyl, etc. radicals; aliphatic and cycloaliphatic radicals, including alkenyl, such as vinyl, propenyl, etc. radicals; alkyl such as methyl, ethyl, propyl, butyl, etc. radicals; cyclohexyl, etc. radicals; haloaliphatic including chloroalkyl, such as chloropropyl, etc. radicals. R and R' can be all the same radical or a mixture of any two or more of the aforementioned radicals respectively. R is preferably hydrogen and R' is preferably methyl, phenyl and halophenyl.

The novel trifluoroalkoxyalkyl substituted organosilicon compounds of Formulae 1 and 2 can be homopolymerized or copolymerized with conventional organohalosilanes or cyclopolysiloxanes in accordance with art recognized cohydrolysis and equilibration procedures, resulting in molecular rearrangement and intercondensation of organosiloxy units to produce a variety of useful trifluoroalkoxyalkyl substituted organopolysiloxanes in the form of fluids, resins, and rubbers.

Representative of the organosilicon compounds that can be intercondensed with the trifluoroalkoxyalkyl silicon compounds of Formulae 1 and 2 above are organohalosilanes having the formula:

(3) $(R'')_dSiX_{4-d}$ and cyclopolysiloxanes (4) 

to produce the trifluoroalkoxyalkyl substituted organopolysiloxanes of the present invention.

(5) 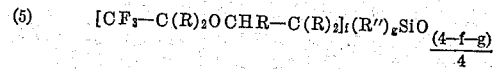

where R and X are as defined above, and R" includes monovalent and halogenated monovalent hydrocarbon radicals within the scope of R' as defined above, and cyanoalkyl radicals, preferably cyanoethyl radicals, $d$ is an integer equal to from 1 to 3, inclusive, $e$ is an integer equal to from 3 to 10, inclusive, $f$ is equal to from .01 to 2, inclusive, $g$ is equal to from 0.99 to 2, inclusive, the sum of $f$ and $g$ is equal to from 1 to 3, inclusive.

The novel trifluoroalkoxyalkyl substituted organosilicon compounds of Formulae 1 and 2 can be made by the addition of a trifluoroalkoxyalkene having the formula:

(6) $CF_3—C(R)_2—O—CR=C(R)_2$ to what will be referred to as a "silicon hydride" which can be a silane having the formula:

(7) $H—Si—R'_aX_{3-a}$ or a cyclopolysiloxane having the formula:

(8) 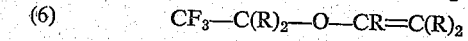

in the presence of a catalyst at temperatures in the range of 30 to 150° C. where R', X, $a$, $b$ and $c$ are as defined above.

The novel trifluoroalkoxyalkyl substituted organopolysiloxanes of Formula 5 are useful in a variety of applications. For example, substituted organopolysiloxanes of Formula 5 that have a ratio of 1.95 to 2.01 organic radicals, including trifluoroalkoxyalkyl radicals, per silicon atom attached to silicon by carbon-silicon linkages that are convertible to the cured, solid, elastic state and contain 5 to 95, and preferably 5 to 30 mol percent of trifluoroalkoxyalkyl radicals based on the total number of organic radicals in said organopolysiloxanes can be reinforced with conventional fillers such as silica fillers, and semi-reinforcing fillers including lead oxide, calcium carbonate, etc. to produce organopolysiloxane elastomers having improved oil resistance. The organopolysiloxanes of Formula 5 having a ratio of 2.01 to 3.0 organic radicals per silicon atom attached to silicon by carbon-silicon linkages, including trifluoroalkoxyalkyl radicals in the range of 5 to 70 mol percent, and preferably 5 to 50 mol percent based on the total number of organic radicals in said organopolysiloxane can be employed as plasticizers for synthetic resins and for the production of improved oil resistant greases.

Included within the trifluoroalkoxyalkenes of Formula 6 are 1,1,1 - trifluoroethoxyethylene, 1,1,1 - trifluoro-2-methylethoxyethylene, etc. Halosilanes within the scope of Formula 7 include trichlorosilane, methyldichlorosilane, phenyldichlorosilane, etc.

In the practice of the invention, a silicon hydride, such as silane of Formula 7 or cyclopolysiloxane of Formula 8, is reacted with a trifluoroalkoxyalkene of Formula 6 to form the trifluoroalkoxyalkyl substituted organosilicon compounds of the present invention. The compounds of the present invention can then be intercondensed in accordance with well known procedures by cohydrolysis or rearrangement reactions with conventional organohalosilanes and cyclopolysiloxanes to form a variety of novel and unique materials.

The addition of the trifluoroalkoxyalkene to the silicon hydride can be effected by merely forming and refluxing a mixture the aforesaid trifluoro compound and silicon hydride in the presence of a finely divided metal catalyst such as platinum on carbon, chloroplatinic, etc. In forming the trifluoroalkoxyalkene-silicon hydride mixture, it has been found expedient to add the silicon hydride to a mixture of the trifluoroalkoxyalkene and the metal catalyst, particularly when the silicon hydride is a halosilane. The ratio of reactants employed during the addition reaction is not critical and is largely dictated by economic consideration. It is preferred to employ the trifluoroalkoxyalkene and the silicon hydride in stoichimetric proportions. The finely divided metal catalyst can be employed in concentrations ranging from 0.0005 parts to 0.1 parts per part of the reaction mixture.

Temperatures in the range of 30° C. to 150° C. can be employed during the addition reaction. The addition reaction can vary over a period of from an hour or less to many hours, depending on the rate of addition, catalyst employed, etc.

The trifluoroalkoxyalkyl substituted organosilicon compounds of the present invention can then be cohydrolyzed or intercondensed in accordance with well known procedures either alone or with other organohalosilanes or cyclopolysiloxanes. Standard equilibrating catalysts such as potassium hydroxide, ferric chloride hexahydrate, phenylphosphorylchloride, etc. can be employed. Temperatures in the range of 100° C. to 180° C. can be utilized during the cohydrolysis and intercondensation reaction.

In order that those skilled in the art may be better able to understand the practice of the present invention, the following examples, are given by way of illustration and not by way of limitation. All parts are by weight.

EXAMPLE 1

There was added to a reaction vessel equipped with a reflux condenser, thermometer and dropping funnel, a mixture of about .015 part of platinum in a finely divided form on carbon and 26 parts of 1,1,1-trifluoroethoxyethylene that contained an antioxidant. The mixture was heated to 40° C. and 37 parts methylhydrogen dichlorosilane was slowly added to the heated mixture over a period of one hour. The reaction temperature rose from 42° C. to 84° C. during the addition. The mixture was refluxed for two additional hours. The crude product was then distilled at 86° C. (50 mm.), and there was recovered 48 parts of a product having the formula:

$$CF_3-CH_2-O-CH_2-CH_2-Si(CH_3)Cl_2$$

This product had a refractive index $n_D^{25}$ 1.3952 and contained 29.41 percent chlorine as compared with the theoretical value of 29.42.

EXAMPLE 2

The procedure of Example 1 was repeated except that 34 parts of trichlorosilane was added over a period of 1 hour to a mixture of 20 parts of 1,1,1-trifluoroethoxyethylene and .015 part of platinum catalyst on carbon. During the addition the temperature rose from 36° to 40° C. and the reflux was continued for an additional 8 hours. The final product (3.5 parts) was found to have a boiling point of 83–85° C. at 44 millimeters and had the formula:

$$CF_3-CH_2-O-CH_2-CH_2-SiCl_3$$

EXAMPLE 3

A mixture of 20 parts of dimethyldichlorosilane, 0.5 part of trimethylchlorosilane, 50 parts of toluene and 020 parts of the 1,1,1-trifluoroethoxyethylsilylmethyldichlorosilane of Example 1 was placed into a reaction vessel. Water was added to the mixture while stirring at a temperature of 20° C. The resulting mixture was stirred for an additional half hour at 20° C. and then heated at 40° C. for 1½ hours. The crude product was separated and stripped at 138° C. pot temperature. There was obtained 25 parts of a fluid, $n_D^{25}$ 1.3923, having a viscosity of 5 centistokes at 25° C., and having the average formula:

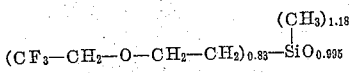

EXAMPLE 4

There was added to a vessel equipped with a stirrer, reflux condenser and thermometer, a mixture of 12 parts of 1,3,5,7-tetramethyl - 1,3,5,7 - tetrahydrocyclotetrasiloxane and 25 parts of 1,1,1-trifluoroethoxyethylene. In addition, 0.7 part of 2% platinum on carbon catalyst was added to the mixture. The resulting mixture began to reflux at 40° C. and reflux was continued for six hours to a temperature of 50° C. There was then added 0.01 part of chloroplatinic acid to further catalyze the reaction. The temperature rose to 98° C. and then the temperature fell off rapidly. The mixture was distilled under reduced pressure (5 mm.) and 20 parts of a cyclic product having the formula:

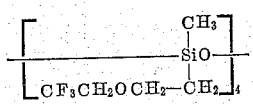

was recovered. This product had a refractive index $n_D^{20}$ 1.3840.

EXAMPLE 5

There was added to a mixture of 14 parts of 1,1,1-trifluoroethoxyethylene and 0.5 part of 2% platinum on carbon catalyst, 17.5 parts of phenyldichlorosilane. The mixture was refluxed to a temperature of 60° C. There was then added 0.01 part of chloroplatinic acid which resulted in a temperature rise to 100° C. The mixture was distilled under reduced pressure (3 mm.) and 23 parts of final product $n_D^{20}$ 1.4730 was recovered having a boiling point of 93° C. and $d^{25}$ 1.3299. The formula of the final product was

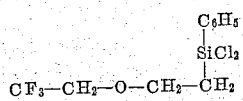

This product contained 23.34 percent chlorine as compared with the theoretical value of 23.47.

EXAMPLE 6

A mixture of 6.8 parts of the fluoroethoxyethyl substituted cyclotetrasiloxane of Example 4, and 0.015 part of potassium hydroxide was heated for 30 minutes in a reaction vessel at a temperature of 150° C. There was then added 6 parts of octamethylcyclotetrasiloxane, and the resulting mixture was heated for 30 minutes at 165° C. An additional 12 parts of octamethylcyclotetrasiloxane was added to the reaction mixture and the mass was stirred for another hour. Another increment of 24 parts of octamethylcyclotetrasiloxane was added, and after another hour of stirring, a final increment of 35 parts was added. The mass polymerized shortly thereafter to a gum. This gum contained 5 mol percent of 1,1,1-trifluoroethoxyethyl radicals based on the total number of organic radicals in the polymer.

A mixture of 100 parts of the above gum, referred to in the table below as the "fluoroalkyl polymer," 40 parts of silica filler and 2 parts of benzoyl peroxide was blended in a doughmixer. The mixture was milled and test samples were cut from a sheet that was press-cured for 10 minutes at 150° C. and post-cured for 16 hours at 155° C.

Control strips were made by a similar procedure from a silica reinforced dimethylpolysiloxane gum formulation.

The cured strips containing the fluoroalkyl polymer and the control were tested for swell resistance as follows:

The test strips were immersed in a mixture of 70 volumes isooctane and 30 volumes toluene for 3 hours at room temperature. The table below shows the relative percent increase in volume in the strips as compared to their original volume.

Table

| Test strips: | Vol. change, percent |
|---|---|
| Fluoroalkyl polymer | 61 |
| Control | 210 |

The above results show that organopolysiloxane elastomer compositions that contain 1,1,1-trifluoroethoxyethyl radicals attached to silicon through carbon-silicon linkages have improved swell resistance compared to a control that is free of trifluoroethoxyethyl radicals.

The trifluoroalkoxyalkyl substituted organosilicon compounds of the present invention illustrated by Formulae 1 and 2 are valuable as intermediates for the production of a wide variety of useful materials. The presence of fluorine radicals in organopolysiloxane elastomers and greases as shown in Formula 5 has been found to impart to these materials improved resistance to the effects of solvents, particularly organic solvents. Trifluoroalkoxyalkyl substituted organopolysiloxane resins have been found to be valuable in electrical insulating, laminating and protective coating applications. Because of their high degree of ionic functionality, these substituted organopolysiloxanes are also eminently suitable as surfactants. Additionally the compositions of the present invention can be employed in the treatment of paper, and metal castings as release agents, sealants, adhesives, lubricants, in the treatment of masonry, ceramics, etc.

While the foregoing examples have of necessity described only a few of the very many trifluoroalkoxyalkyl organosilicon compositions of the present invention, it should be understood that the present invention is directed to a much broader class of compositions as illustrated by Formulae 1 and 2, in addition to the organopolysiloxanes derived therefrom.

What I claim as new and desire to secure by Letters Patent of the United States is:

1. Organopolysiloxanes having the formula:

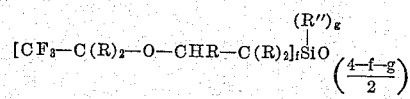

where R is a member selected from the class consisting of hydrogen and lower alkyl groups, R'' is a member selected from the class consisting of monovalent hydrocarbon radicals, halogenated monovalent hydrocarbon radicals and cyanoalkyl radicals, $f$ is equal to from .01 to 2, inclusive, $g$ is equal to from 0.99 to 2, inclusive, and the sum of $f$ and $g$ is equal to from 1 to 3, inclusive.

2. Organosilanes having the formula:

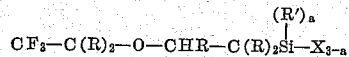

where R is a member selected from the class consisting of hydrogen and lower alkyl groups, R' is a member selected from the class consisting of monovalent hydrocarbon radicals and halogenated monovalent hydrocarbon radicals, $a$ is an integer equal to from 0 to 2, inclusive, and X is halo.

3. Cyclopolysiloxanes having the formula:

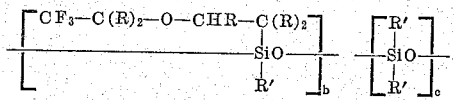

where R is a member selected from the class consisting of hydrogen and lower alkyl groups, R' is a member selected from the class consisting of monovalent hydrocarbon radicals and halogenated monovalent hydrocarbon radicals, $b$, is an integer equal to from 1 to 10, inclusive, $c$ is a whole number equal to from 0 to 9, inclusive, and the sum of $b$ and $c$ is equal to from 3 to 10, inclusive.

4. A compound having the formula:

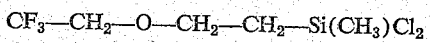

5. A compound having the formula:

6. A compound having the formula:

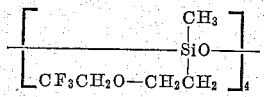

7. A compound having the formula:

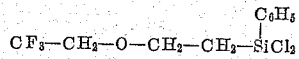

References Cited in the file of this patent

UNITED STATES PATENTS

| | | |
|---|---|---|
| 2,465,188 | Barry et al. | Mar. 22, 1949 |
| 2,651,651 | Simons | Sept. 8, 1953 |
| 2,682,512 | Agre | June 29, 1954 |
| 2,800,494 | Haluska | July 23, 1957 |
| 2,823,218 | Sper et al. | Feb. 11, 1958 |
| 2,892,859 | McBee et al. | June 30, 1959 |
| 2,894,969 | Pierce | July 14, 1959 |
| 2,979,519 | Pierce et al. | Apr. 11, 1961 |
| 2,983,711 | Gordon | May 9, 1961 |
| 2,983,746 | Smith et al. | May 9, 1961 |
| 3,006,878 | Talcott | Oct. 31, 1961 |
| 3,038,000 | Schmidt | June 5, 1962 |

OTHER REFERENCES

Eaborn: Organosilicon Compounds, Academic Press, Inc., 1960, pages 51–64 relied on.